United States Patent [19]
Lesage et al.

[11] Patent Number: 5,622,539
[45] Date of Patent: Apr. 22, 1997

[54] PROCESS AND DEVICE FOR SUPPORTING AND TRANSFERRING GLASS SHEETS IN A SHAPING STATION

[75] Inventors: Jean-Luc Lesage, Margny les Compiegne; Jean-Marc Petitcollin; Jean-Pierre Douche, both of Thourotte; Pascal Tinelli, Compiegne, all of France

[73] Assignee: Saint-Gobain Vitrage International, Courbevoie, France

[21] Appl. No.: 341,886

[22] Filed: Nov. 15, 1994

Related U.S. Application Data

[63] Continuation of Ser. No. 88,529, Jul. 9, 1993, abandoned.

[30] Foreign Application Priority Data

Jul. 9, 1992 [FR] France .................. 92 08482

[51] Int. Cl.⁶ .................. C03B 23/03; C03B 35/24; C03B 23/023
[52] U.S. Cl. .................. 65/106; 65/273; 65/182.2; 65/289

[56] References Cited

U.S. PATENT DOCUMENTS

| | | |
|---|---|---|
| 3,468,645 | 9/1969 | McMaster et al. . |
| 3,607,198 | 9/1971 | Meunier et al. .................. 65/182.2 |
| 3,665,730 | 5/1972 | Linzer . |
| 3,869,271 | 3/1975 | Shaffer et al. . |
| 4,046,543 | 9/1977 | Shields .................. 65/182.2 |
| 4,229,200 | 10/1980 | Seymour . |
| 4,488,893 | 12/1984 | Claassen et al. . |
| 4,764,196 | 8/1988 | Boutier et al. . |
| 5,078,775 | 1/1992 | Maltby, Jr. et al. . |

FOREIGN PATENT DOCUMENTS

| | | |
|---|---|---|
| 240418 | 3/1987 | European Pat. Off. . |
| 255432 | 7/1987 | European Pat. Off. . |
| 351278 | 6/1989 | European Pat. Off. . |
| 389315 | 2/1990 | European Pat. Off. . |
| 2085464 | 4/1970 | France . |
| 255422 | 7/1987 | France . |
| 2678261 | 6/1991 | France . |

Primary Examiner—Donald E. Czaja
Assistant Examiner—Calvin Padgett
Attorney, Agent, or Firm—Oblon, Spivak, McClelland, Maier & Neustadt, P.C.

[57] ABSTRACT

A device for supporting and transferring, in a shaping station (2), at least the central part of glass sheets which have been heated to their shaping temperature. The device includes a pressurized box (21) generating an air cushion. The box has a plurality of individual compartments (53), transverse with respect to the axis of travel of the glass sheets (28), each of the compartments (53) having a width measured parallel to said axis which is small by comparison with the "height" of the glass sheets and, being provided with gas having at least two pressure distribution levels.

13 Claims, 3 Drawing Sheets

FIG_1

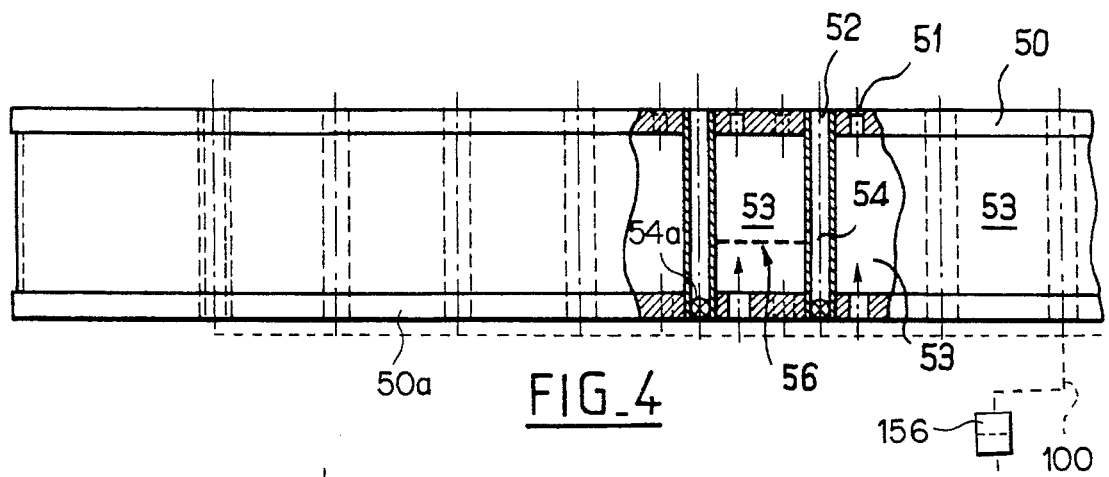
FIG_4
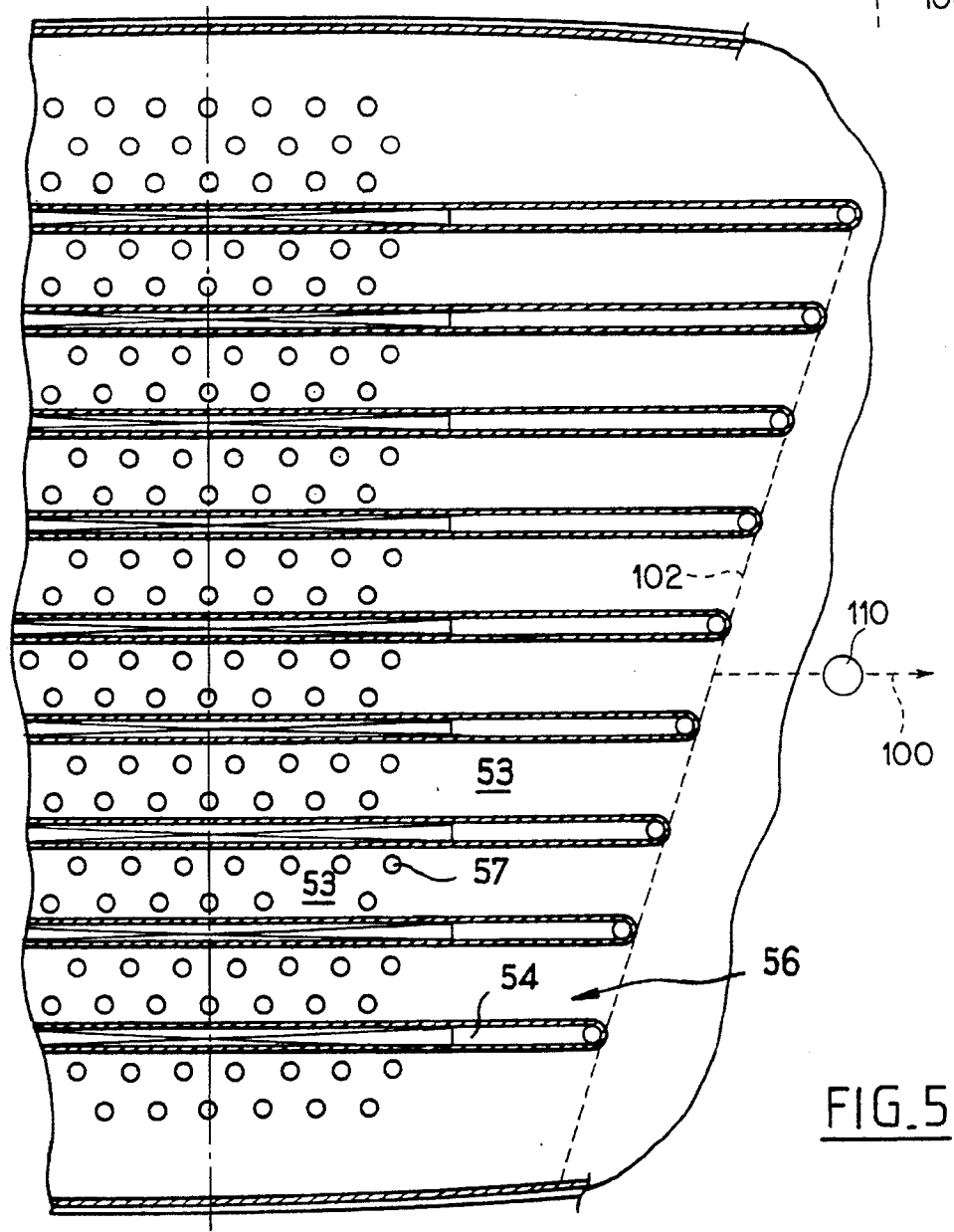
FIG_5

PROCESS AND DEVICE FOR SUPPORTING AND TRANSFERRING GLASS SHEETS IN A SHAPING STATION

This application is a continuation of application Ser. No. 08/088,529, filed on Jul. 9, 1993, now abandoned.

BACKGROUND OF THE INVENTION

1. Field of the Invention

This invention deals with the techniques of bending glass sheets and, more especially, with the devices and processes forming part of these techniques, which enable the glass sheets to be transferred and/or supported inside the shaping station.

2. Description of Related Art

These techniques are intended, preferably, for the production of panes for automobiles, whether they be bent and then toughened (most commonly used for the side and rear windows of the vehicle) or bent and then annealed for the purpose of being assembled to form laminated panes comprising, for example, two glass sheets (used preferably as windscreens).

The panes, especially for automobiles, must comply with very severe criteria, preferably with regard to optical quality and conformity to the prescribed curvature. This is why every effort is made to minimize the risks of defects, for example by friction of the glass sheets against the tools and molds with which they are in contact, thereby creating marks on their surface, and/or as a result of incorrect positioning of the sheets relative to said tools and molds, preferably relative to the bending molds, thereby leading to non-conforming curvatures. This aspect is especially crucial when the sheets are situated in the shaping station, having reached their softening temperature, and are undergoing bending by suction and/or mechanical pressure in direct contact with bending molds.

It may be recalled that in certain conventional bending techniques the glass sheets travel horizontally to the reheating furnace, conveyed on a bed of rollers which continues right into the shaping station, from which roller bed they are then raised, preferably by peripheral suction created by a suction box, into contact with the lower, curved face of an upper bending mold, the curvature of which face they hug more or less closely under the effect of the suction. This shaping may then be completed, either under the combined action of inertia and gravity by dropping the sheets onto an annular lower mold, or by mechanical pressing of the sheets between upper mold and annular lower mold. These sheets are then removed, either on the same lower annular mold or on a special annular mold for toughening, to the toughening/thermal treatment station. Reference may be made to Patents FR-B-2 085 464; EP-B-241 355; EP-A-240 418; EP-A-241 355; EP-A-255 432 and EP-A-389 315.

A problem arises, however, in choosing the means for transferring and/or supporting the glass sheets in this station, which means should be the most suitable for maintaining the optical quality of said glass sheets at high temperatures.

The aforementioned bending techniques suggest, in fact, as a means for transferring the glass sheets from the furnace to the shaping station and then as a means for supporting the glass sheets in this station before they are taken over by the bending molds, a simple succession of conveying rollers continuing the roller bed that is present in the furnace. This implies a direct mechanical contact between rollers and softened sheets in the station, which limits the possibilities of recentering the sheets relative to the bending molds (a recentering carried out, for example, by the means explained in Patent Application EP-A-389 315, already mentioned), since any repositioning of the sheets leads to a relative sliding between sheets and rollers, and the resulting friction which generates marks.

Other bending techniques have proposed different means for conveying and/or supporting the sheets in the shaping station. Patent Appl. EP-A-0 351 278 describes a bending process consisting of conveying the sheets from the furnace to the shaping station by means of a flexible conveyer belt bringing the sheets to a stop underneath the bending mold which, by suction, then takes them over. This belt may, in addition, participate in the bending by fulfilling the function of a lower, pressing counter-mold. The point contacts between rollers and sheets are thus replaced here by a continuous contact between sheets and flexible material, but this is still a mechanical contact that is liable to create marks on the sheets.

There is also known an "entire air cushion" process, described preferably in U.S. Pat. No. 3,869,271, in which successive air cushions in the furnace continue into an air cushion in the shaping cell, thus providing for the entirety of the conveying of the sheets. The performance of this process, however, is difficult, because it is not easy to guarantee good planarity of the entirety of the cushions over such a considerable length, more especially since the sole embodiment uses pressurized boxes of porous ceramic, which are very difficult to manufacture and expensive and are variable in their reproducibility.

Furthermore, the use of an air cushion in the upstream part of the furnace, that is when the glass sheets are still very stiff, tends to create defects in planarity on these sheets, preferably transverse concavities relative to their axis of travel, which defects can lead to accidental physical contacts between the lower face of the glass sheets and the box generating the air cushion.

SUMMARY OF THE INVENTION

The present invention therefore has as an object the development of a means for transferring and supporting the glass sheets in a shaping station which is suitable for operating at high temperature, maintaining the optical quality of the sheets even in the case of a recentering operation in their conveying plane, and which is simple in its construction and execution.

According to this invention, the device for supporting and/or transferring, in a shaping station, at least the central part of glass sheets heated to their shaping temperature comprises a pressurized box creating an air cushion.

Said box comprises a plurality of individual compartments transverse to the axis of travel of the glass sheets. Each of the compartments has, on the one hand, a width (measured parallel to said axis) that is small by comparison with the "height" of the glass sheets and, on the other hand, is equipped with means for supplying gas possessing at least two pressure distribution levels. (The "height" of the sheets corresponds, within the context of this invention, to their dimension measured parallel to their axis of travel).

The choice of an air cushion device has many advantages, preferably compared with a roller bed, because it offers a pneumatic and non-mechanical contact surface to the softened glass sheets. In this way risks of marking their lower faces are avoided, even in the case of a recentering operation of the sheets on this cushion relative to the bending molds, this being done just before they are taken over by said molds, which eliminates any risk of the glass sheets again becoming disoriented before they are bent.

Until now, it was a problem to achieve a good uniformity of the support surface for this air cushion at temperatures which may well be higher than 600° C.

Now two specific characteristics of the air cushion according to this invention, i.e., the compartmentalizing of the box creating the cushion and the use of several pressure distribution levels, combine to assure a perfect uniformity of the air cushion, both in time and in its pressure parameters at every point.

It is far more difficult to guarantee homogeneity in time of the support by an air cushion when it must discontinuously carry glass sheets than when it carries, for example, a continuous glass band.

In the first case, which is that with which this invention is concerned, it is necessary for the air cushion to be able to "react" correctly to the repeated changes in operating conditions caused by the advancing of each of the glass sheets on its surface.

The dividing of the box into compartments amounts to creating not a single air cushion, but a plurality of air cushions adjacent to one another and having a contact area with the glass sheets that is much smaller. Therefore, as each of the glass sheets moves progressively forward over the box, each of these "small" air cushions progressively enters into an operating regime that is independent of all the others and becomes stabilized much more rapidly than would be possible for a non-segmented air cushion, hereinafter termed a "global air cushion". It is, furthermore, intrinsically much easier to achieve a good homogeneity in the case of an air cushion of small size than in the case of a larger air cushion, because it is technically easier to guarantee uniform characteristics of blowing and discharge of gas over a small area than over a large one.

Furthermore, the pressure distribution levels of the supply means for gas provided according to this invention enable a good uniformity of pressure to be obtained at every point in each of the air cushions generated by the compartment. This is necessary since the glass sheets, above their softening temperature, that is at around 650° C., behave as a viscous material, which would deform irrecoverably if the pressure regime operating in the global air cushion were locally heterogeneous.

At least one first pressure distribution level may be obtained directly in the supply duct for gas to each of the compartments, which duct furthermore may be centralized and common to all the compartments. At least one other pressure distribution level may also be provided also inside each of said compartments. These levels of distribution may, for example, be very easily obtained by interposing in the gas flow at least one plate perforated by preferably uniformly distributed orifices.

Preferably, the upper face of the box which covers all the compartments has an alternation of supply orifices, preferably circular orifices, and of outlet slots, preferably extending transverse to the axis of travel of the glass sheets. In fact, it has proved advantageous to provide the outlet slots also, rather than to be content with a peripheral escape of the gases, which has been found experimentally tend to cause a "bell" phenomenon resulting from excess pressure at the center of the air cushions due to the difficulties of gas discharge.

For reasons of simplicity of design, it is desirable to remove the gases from the air cushion without the need to use a suction system at the position of its slots in the box. In this case it is preferable to adapt the dimensions of the slots so as to make them sufficiently wide, for example, and to provide a distance separating the bottom of the box from the floor which is sufficient, in order to assure a satisfactory removal of the gases at the position of the shaping station.

It is, however, also possible to make use of suction devices at the position of these slots, thus making the structure of the box more complex but allowing a more optimized control of the discharge of these gases.

Furthermore, in order to prevent the creation of perturbations in pressure inside the compartments of the box, these slots advantageously continue inside the box as discharge sleeves for the gases from the box. Suction means are then preferably provided for these gases at the outlet from said sleeves in the shaping station, in order to perform a recycling of the gases.

The simplest embodiment of the invention consists of using these sleeves as dividing walls for the compartments of the box, the sleeves then being also able to fulfil the function of mechanical stiffeners for the box.

The device according to this invention preferably uses a gas supply produced by a generator of the hot air blower type or Venturi tube type, that is to say well known generators, since this enables a global air cushion to be obtained suitable for supporting glass sheets in a satisfactory manner without the need for very high flow rates and/or pressures.

A plate of metal machined in an appropriate manner and then thermally stabilized is used, at least for forming the upper face of the box which covers all the compartments, this being a simple and reproducible form of construction. It is also possible to envisage a metal plate or ceramic plate which could be molded.

In the case where the air cushion is intended for supporting the glass sheet in its shaping station before it is taken over by a lower annular (open-centered) mold, preferably for a pressing operation of the sheet against a curved, solid upper mold, it is advantageous to place the annular mold at the periphery of the air cushion so that the mold may be able to engage the edges of the sheet without perturbing interference with the air cushion. It is best to then create an air cushion, the contour of which is similar to that of the glass sheet but of slightly smaller proportions, since the cushion needs to support only the central part of the glass sheet and not its extreme periphery.

The invention also has as an object a process for using this device. This involves, preferably, the adjusting of the control of the air cushion, that is to say preferably setting the functional parameters such as the supply of gas and the structural parameters of the device, such as the number and the design of the pressure distribution levels, so as to obtain an air cushion which gives to the glass sheets an appropriate "lift height". This lift height is defined as the distance, measured perpendicularly to the plane of the air cushion, between the upper face of the pressurization box and the lower face of the glass sheet. The choice of this lift height is important, because it is a condition for a transfer without bumps or knocks between the conveying means outside the shaping station and the air cushion inside the station. Preferably, a lift height of between 0.5 and 3 mm will be chosen, more preferably of approximately 2 mm, a range which avoids the need for excessively accurate and difficult adjustments between the level of the preceding conveying means, such as rollers, and the level of the air cushion. In addition, by choosing a sufficiently large lift height, the risks of accidental marking of the glass sheets on contact with the upper face of the pressurization box and/or on contact with traces of broken glass that may be present in this box, are reduced.

This lift height is preferably chosen for the same reasons in correlation with an optimized "stiffness" of cushion, a stiffness which can be chosen, preferably, according to the same aforementioned operating and/or structural parameters. This property of stiffness may be defined as the aptitude of an air cushion to react instantaneously to an altitude effect at a point of a glass sheet, for example for preventing a glass sheet which adopts a slight inclination due to a level of air cushion that is slightly lower than that of the preceding roller bed from striking at its front end against the upper face of the box. If too "stiff", an air cushion may create destabilization vibration phenomena. In practice, this stiffness is evaluated, preferably, by calculating the ratio between the pressure in the box and the pressure in the air cushion. Within the framework of this invention, this ratio will preferably be chosen between 3 and 7, which leads to satisfactory stiffness. This implies that a great part of the loss of head takes place in the compartments inside the box, and not at the air cushion alone. This characteristic is advantageous, because it contributes to reducing the sequential perturbation phenomenon of the air cushion due to the intermittent arrival of the glass sheets on its surface. In fact, if the greater part of the loss of head were to take place at the level of the air cushion, each arrival of sheets would create a much greater instantaneous loss of head, which would therefore be much more perturbing.

It is preferable, in addition, to adjust the setting of the air cushion and, preferably, the supply of gas, in such a way that the speed of the gases of the air cushion against the lower face of the glass sheets does not exceed 20 m/s in order to avoid any risk of creating marking resulting from the impact of the gases arriving in contact with these sheets.

In order not to create differences in temperature within the thickness of the glass, the supply gases to the global air cushion are preferably at a temperature very close to that of the glass sheets and/or the atmosphere of the shaping station. The temperature of the feed gas may, however, be slightly higher, in order to create a slight overheating of the lower faces of the glass sheets, these being the faces intended to be in extension during contact with the upper, curved mold. This excess heating thus facilitates bending, preferably in those cases where a considerable degree of curvature is to be given to the sheets. As this excess heating is performed on an air cushion and without later contact of the softened sheets with a mechanical conveyor of the roller type before their bending, it becomes possible to increase it without creating a greater risk of marks and/or undulations, as is the case when the sheets are supported by rollers, and this is a great advantage.

The invention also relates to processes of bending using the device of this invention, processes which consist of conveying the glass sheets on a bed of rollers through a reheating furnace intended for heating them to their bending temperature, then of causing them to slide over the air cushion generated by the pressurized box of the invention in the bending station, and of stopping them on said cushion before taking them over by the various bending tools.

Preferably, within the scope of the bending technique explained in French Patent application FR-A-2 678 261 (corresponds to copending U.S. patent application Ser. No. 07/909,081, filed Jun. 29, 1992), the bending process consists of heating each glass sheet in a horizontal furnace, through which it passes while travelling on a conveyor of the motorized roller type which conveys it into a bending station, where it is kept at an ambient temperature substantially equal to that of the glass sheet, then of stopping the sheet in the bending station vertically above an annular lower mold surrounding the device of this invention, comprising the pressurized box which generates the air cushion supporting the glass sheet in its central part, then of raising the annular lower mold so that it presses the sheet against the upper bending mold. Preferably, both the annular lower mold and the device comprising the pressurized box are mounted on a plate situated outside the bending station.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a cross-sectional view through said pressurized box parallel to the axis of travel of the glass sheets coming from the furnace;

FIG. 5 is a half-section through the same pressurized box on a plane parallel to its upper face.

DESCRIPTION OF THE PREFERRED EMBODIMENT

Figure 1:
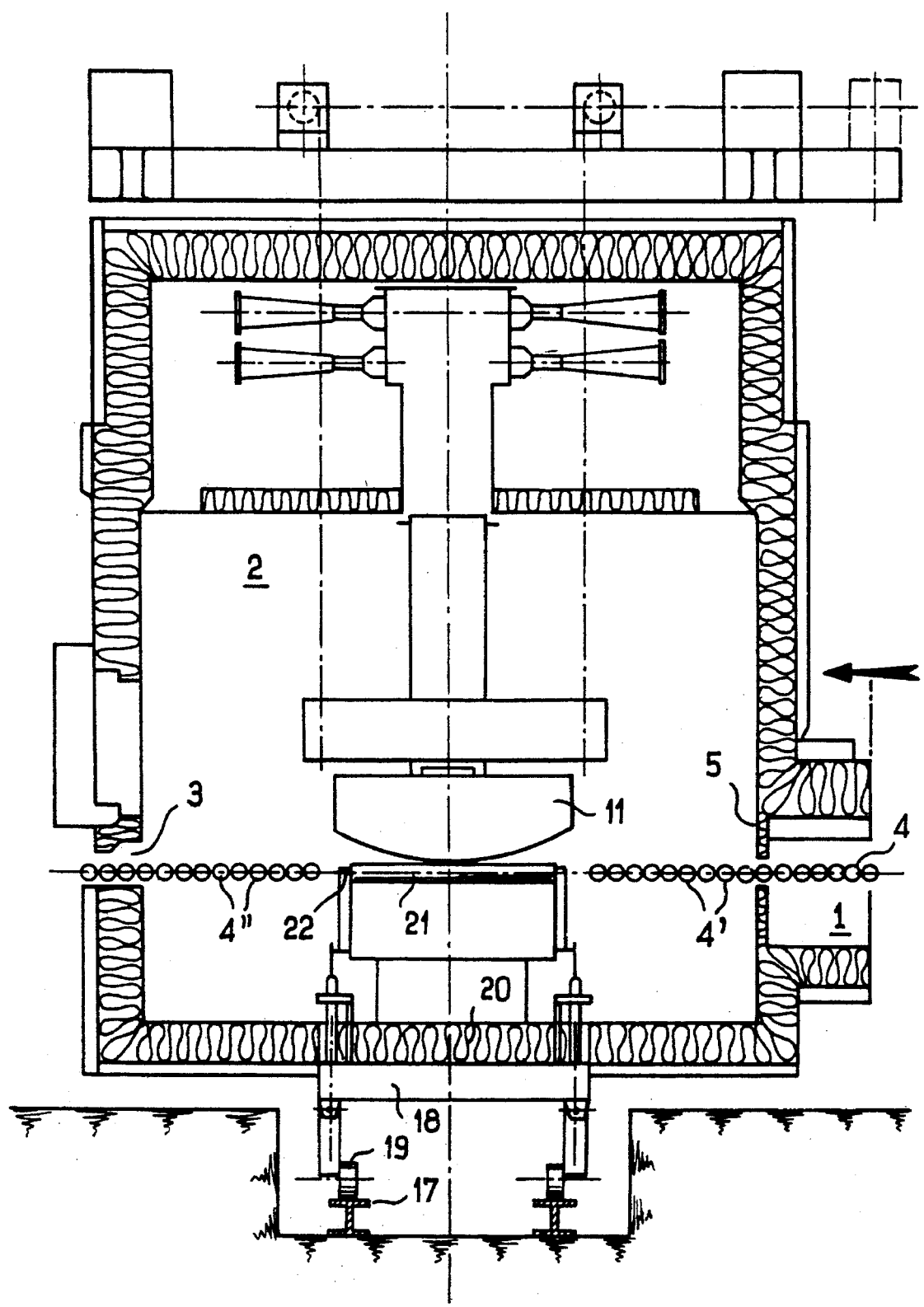
FIG. 1 show a shaping station viewed from the side, comprising the box generating the air cushion according to this invention.
Figure 2:
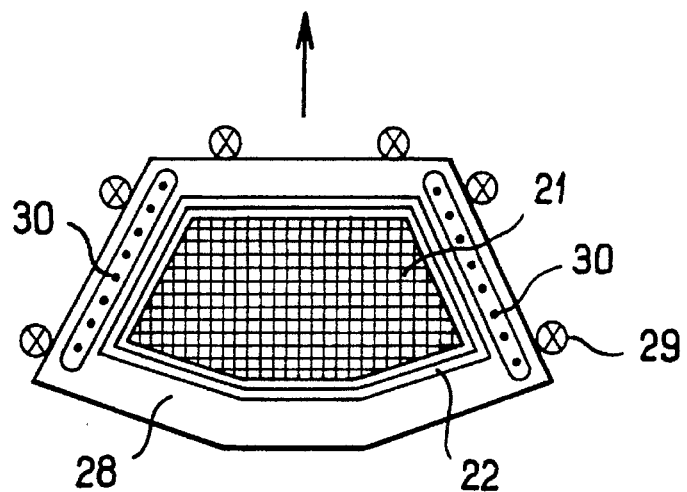
FIG. 2 is a view from below of a glass sheet supported by the air cushion according to this invention and centered above the annular, lower bending mold.

It is particularly advantageous to use the support devices and processes according to this invention in the context of the bending technique described in FIGS. 1 and 2 of the present application, repeating the teaching of French Patent Application FR-A 2 678 261, to which reference may be made for greater details. It will be self-evident, however, that the device and process of this invention may advantageously be used in any shaping station and whatever the bending technique envisaged. They may thus advantageously be used instead of any of the conveying and supporting means for glass sheets in the station, preferably those described in the Patents or Patent Applications listed previously.

In FIG. 1, there is shown a bending station 2 equipped with an outlet 3 towards the cooling station and following a furnace 1, of which only the last part is illustrated. In this furnace, the glass sheet is conveyed by an assembly of driven rollers 4, for example rollers made of silica or other refractory ceramic.

This conveyor continues into the bending station (rollers 4'), which is a thermally insulated enclosure in which a temperature is maintained of the order of the bending temperature of the glass sheets, typically on the order of 650° C. when thermal toughening is intended and on the order of 550° C. for a later annealing. A curtain 5 may, if desired, be used for preventing parasitic air currents which could be generated, for example, during charging of the furnace. The conveyor is interrupted in the shaping zone proper, but the new rollers 4" are disposed in the same alignment on the other side of this zone to enable an untreated body of glass to be removed, if necessary.

Between these rollers 4' and 4" there is disposed the support device 21 for the glass sheets according to this invention, generating an air cushion which continues the conveying plane defined by these rollers.

The lower part of the shaping station comprises a plate 18, carried by a carriage or provided directly with trains of wheels 19. This plate 18 carries an insulating element 20, the pressurized box 21 for the air cushion and the annular lower mold 22. With such an arrangement, when it is desired to change the production of panes, it is easy to remove both the annular mold 22 and the box 21 from the bending station 2 in one operation by means of the plate 18, and then to replace them.

Said annular mold 22 is preferably composed of a continuous rail, which limits the risks of marking of the surface of the glass, but it may also be formed, for example, of three elements articulated together, for the purpose of solving the problems of more complex bending operations. On the annular lower mold 22 there are mounted indexing fingers (not shown) which engage into associated slots or eyes (not shown) on the upper mold 11.

FIG. 2 makes it possible to visualize, as seen from below, the relative position of this lower mold 22 and of the box 21 for the air cushion.

Figure 3:
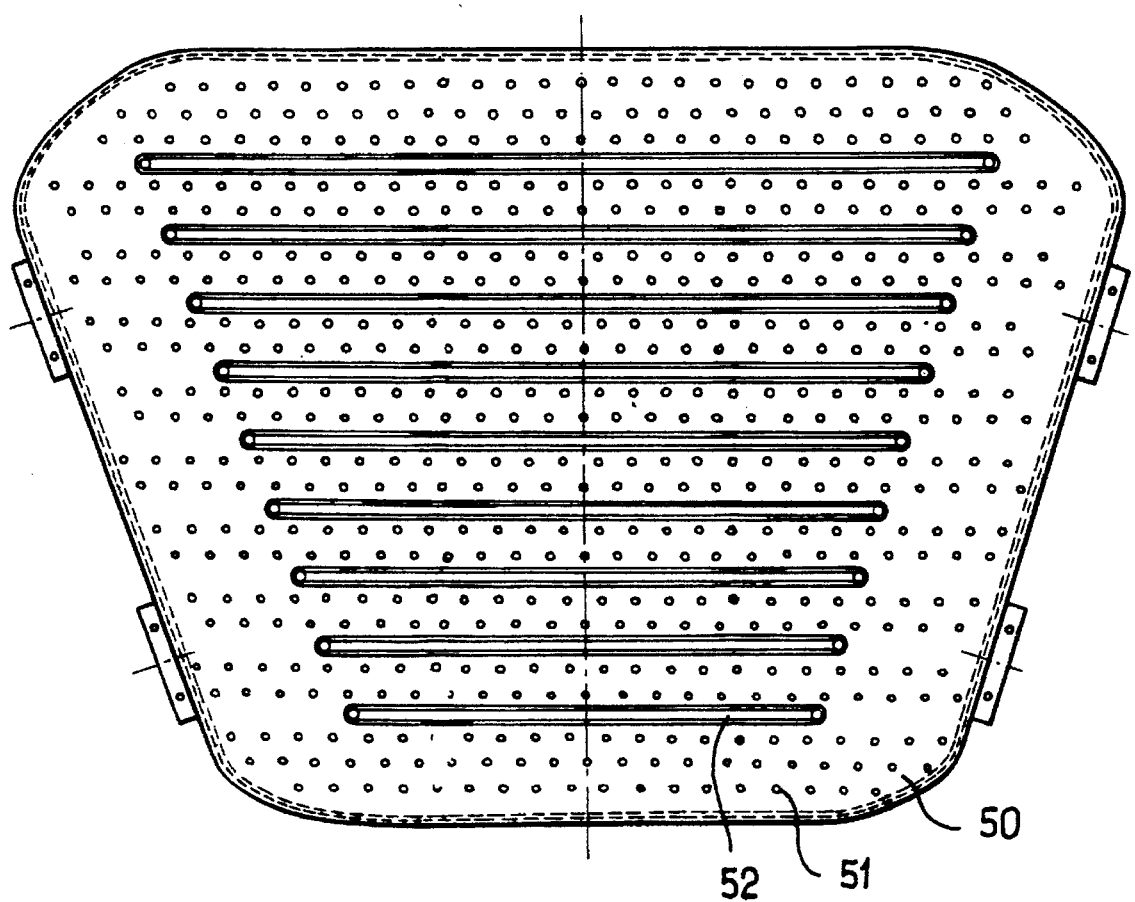
FIG. 3 is a view from above of the pressurized box generating the air cushion according to this invention.

The box for the air cushion, of course a hot air cushion, is more especially detailed in FIGS. 3 to 5. Situated at the center of the annular mold 22, the air cushion may be easily regulated so as to hold the glass sheet at the same level as the roller conveyor during the taking-over of the glass sheets 28. As a general rule, the air cushion serves only for supporting the glass sheet 28, the movement of which is controlled by the contact of its rear part with the rollers. In practice, this control is perfectly effective so long as the glass is in contact with at least one roller, the air cushion creating virtually no retardation of the movement of the glass. Nevertheless, it may be necessary to provide means for helping the advance of the glass sheet, such as a blowing of hot air onto the edge face, an inclined orientation of some of the orifices of the upper plate 50 (FIG. 3) or a slight slope of the air cushion.

It should be emphasized that, in the case of the invention, the only air cushion used is in the shaping zone, which avoids numerous disadvantages that are well known in the use of air cushions. In the first place, it is perfectly possible to operate a differentiated heating of the lower face of the glass sheet 28 in the furnace, because it is there supported by rollers. On the other hand, the trajectory of the glass sheet 28 indicated by the arrow shown in FIG. 2 is controlled much more satisfactorily with rollers.

As a result of the air cushion in the shaping zone and of convergence stops 29, it is very easy to correct for any deviations in the glass trajectory, on the order of a few millimeters, caused by the rollers of the furnace. These lateral convergence stops 29 are fixed to the upper bending mold 11 or are referenced relative to it. In fact, if, as shown schematically in FIG. 2, the glass sheet 28 advances "point first", it is necessary only that any lateral offsetting that it may possess shall not prevent it from passing between the convergence stops for a perfect centering to be finally achieved (in practice this most commonly allows an offset of several centimeters, which is amply sufficient). The glass, still in contact with at least one roller 4 which provides driving for the sheet, will slide laterally on the air cushion without the slightest risk of damage.

With a device of this type, the positioning of the stationary glass sheet 28 is thus completely independent of the air cushion, which constitutes purely a support means for the glass. Moreover, glass sheet 28 and upper bending mold 11 are in perfect coincidence, even if the upper bending mold shifts from its reference position.

In FIG. 2, in order to compensate, if necessary, for a collapse of the peripheral part of the sheet of glass not supported by the air cushion, the annular lower mold 22 may be provided with hot air blowing nozzle systems 30.

The bending operation consists of bringing the glass sheet onto the air cushion created by the box 21, then of lowering the upper bending mold 11, which mold causes, due to stops 29, said sheet to center on the cushion.

The convergence stops 29 may, if necessary, be withdrawn during the start of peripheral suction which causes the glass sheet to rise. The glass sheet is thus preshaped in contact with the upper bending mold. The annular lower mold 22 is then raised into the pressing position. When pressing is completed, the glass sheet is held by suction against the upper bending mold 11, which is then raised into its upper position. A transfer frame—or any other analogous means then comes to take the bent glass sheet away to the cooling station.

FIGS. 3 to 5 will now explain in detail the structure of the box 2 of the invention.

FIG. 3 is a view from above of the box 21, the contours of which, as can be seen in FIG. 2, follow those of the glass sheets but are slightly reduced in proportion so as to leave their periphery free for later taking over by the annular lower mold 22. The upper face of the box 21 of FIG. 3 is formed of a machined and thermally stabilized metal upper plate 50, of approximately 10 mm thickness, this plate being provided with alternating supply holes 51 for gas, uniformly distributed and of approximately 6 mm diameter, and outlet slots 52, disposed perpendicularly to the axis of travel of the glass sheets and of approximately 12 mm width.

FIG. 4 shows a schematic cross-section through the box 21 parallel to the axis of travel of the glass sheets. It can be seen that the upper plate 50 covers a plurality of compartments 53, the walls of which are formed of the discharge sleeves 54 which conduct away, via end openings 54a and a common end manifold 102, the discharged gases entering the box 21 through the outlet slots 52 extending from the upper plate 50 to a lower plate 50a. These sleeves thus partition off the compartments 53, each creating a portion of the air cushion, which permits a much more rapid establishment of the global air cushion as each of the glass sheets advances and then stops over it. The width of each compartment, which in the present case corresponds to the distance between two sleeves 54, may preferably be from 75 to 150 mm, and good results have been obtained with a distance in the region of 100 mm.

As FIG. 3 shows, the box 21 has thus been segmented into ten compartments for supporting the central part of a glass sheet, in this particular case a sheet having a generally trapezoidal shape and a predetermined height of approximately 1 meter. The sum of the widths of each of these compartments, each much smaller than the total height of the sheet, provides an extremely uniform support for the sheet.

The supply of gas to each of the compartments 53 is provided by a common supply duct 100 situated beneath the box 21 and substantially at its geometric center.

Two means for pressure distribution are provided in the present case for assuring a good homogeneous distribution of pressure in the air cushion above the plate 50. The one (156) in the common supply duct, the other referenced generally 56 present at mid-height in each of the compartments 53 and shown more clearly in FIG. 5: these are composed of metal plates machined in such a way as to have a distribution of orifices 57 which homogenizes the gas flow, either in this common supply duct, or inside each of the compartments 53. In the latter case it is preferred, as indicated in FIG. 5, to provide each of the compartments with a perforated plate 56 having a homogeneous distribution of orifices 57 in its central region. In this way, the pressure in each compartment 53 is absolutely uniform, which gives to the global air cushion a very uniform pressure, maintaining the planarity of the sheets which are at their softening temperature and therefore susceptible to deformations.

It should be noted, in addition, that at the periphery of the plate 50 of the box 21, the gases of the air cushion can leave not only through the slots 52 of the sleeves 54 but also freely over the surface of the plate. This is why it is preferable, as shown in FIG. 3, for the purpose of allowing a more homogeneous discharge of the gases, to restrict the length of said slots 52 slightly in this plate 50, so that they do not continue as far as its extreme edges.

In addition, it is also advantageously possible to provide a densification (not shown) of the gas supply holes 51 at the periphery of the plate 50, so that, at the same gas velocity and for the same pressure level, the blowing of the feed gases will be greater onto the periphery of the lower face of the glass sheet, which enables the increased tangential discharge of the gases at the periphery of the plate 50 to be compensated for, and even allows the lift height to be slightly increased at the periphery of the sheet. In this way, any risk of collapse or sagging of the edges of the sheet is prevented, the extreme periphery of this sheet being unsupported by the air cushion before being taken over by the lower annular mold 22.

The supply and the discharge of the gases of the air cushion take place in a closed circuit, with a hot air blower 110 delivering approximately 8,000 m³/h. The blower supplies the gases through the common supply duct 100 to the regions below the plates 56 and then recovers the gas discharged at the outlets of the discharge sleeves 54 in the shaping station by means of suction mouths at a certain distance from said sleeves. Sucking the gas in this way from the lower part of the shaping station contributes, furthermore, advantageously to the homogenization of the temperature of the atmosphere in said station, since this gas, when reheated and then reinjected into the air cushion, heats the atmosphere of the station by convection.

In the present case it is decided, for example, to obtain a lift height of approximately 2 mm.

It is decided also to choose a gas velocity of approximately 10 m/s and a cushion stiffness defined, on the one hand, by the pressure obtaining in the compartments 53 of the box, in the present case of approximately 300 to 700 Pa (whereas in the common supply duct upstream of the perforated metal plate with which it is fitted for the purpose of creating a pressure distribution level, the pressure is approximately 1,500 Pa) and, on the other hand, by the pressure in the air cushion, in the present case approximately 100 Pa. The greater part of the loss of head thus occurs inside the compartments. These values of lift height, speed and pressures constitute a good compromise for obtaining an air cushion which will enable glass sheets to be supported without risk of mechanical contact between the lower faces of the sheets and the plate 50 of the box, and without risk of any trace of impact of the gas jets coming from the supply orifices. In addition, its adjusted stiffness enables any slight difference in level between the conveying plane defined by the rollers 4 and that defined by the cushion to be compensated for without problems.

In conclusion, the characteristics, both structural and functional, of the air cushion generated by the support device according to this invention give it homogeneity properties at high temperature, both in time and in space, this homogeneity guaranteeing sliding and then stopping of the glass sheets on the cushion, where applicable accompanied by operations of recentering without adversely affecting their optical quality.

In addition, it should be noted that said support device by air cushion is of extreme simplicity in design, which makes the change of device at each change of production of a given pane readily envisageable and industrially acceptable, without involving notable extra cost and/or any special complexity in starting-up.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a bending station for shaping heated glass sheets and including means for moving the glass sheets therein and an annular mold member, a device for supporting a central part of stationary glass sheets in the bending station, said device comprising a pressure box surrounded by said annular mold member and generating a gas cushion smaller than the glass sheet and comprising:

a plurality of individual compartments which are elongate in a direction transverse to a direction of travel of the glass sheets, said compartments having a width in the direction of glass sheet travel which is smaller than a height of the glass sheet in the direction of glass sheet travel;

means for supplying said compartments with hot gas having a temperature of at least 600° C.;

means for providing the gas supplied to said compartments with at least two pressure distribution levels;

an upper plate forming an upper wall of said compartments and having a homogeneous distribution of substantially circular gas supply orifices and gas discharge slots in a central region thereof, and through which gas in said compartments may be supplied to, and discharged from, the gas cushion; and gas discharge sleeves defining walls of said compartments, said gas discharge sleeves being connected to said gas discharge slots and extending into said pressure box.

2. The bending station of claim 1 wherein said means for providing at least two pressure distribution levels comprise at least one perforated plate traversing gas flow in each of said compartments.

3. The bending station of claim 1 wherein said gas supplying means comprise a common supply duct for all of said compartments.

4. The bending station of claim 2 wherein said gas supply means comprise a common supply duct for all of said compartments.

5. The bending station of claim 1 including suction means for recycling gas from said discharge sleeves to said gas supplying means.

6. The bending station of claim 1 wherein said gas supplying means comprise a hot air blower.

7. The bending station of claim 1 wherein said upper plate comprises a machined and thermally stabilized metal plate.

8. A process for supporting at least a central part of heated glass sheets moving through a bending station including a pressure box comprising a plurality of individual compartments which are elongate in a direction transverse to a direction of travel of the glass sheets, said compartments having a width in the direction of glass sheet travel which is smaller than a height of the glass sheet in the direction of glass sheet travel, means for supplying said compartments with hot gas and means for providing the gas supplied to said compartments with at least two pressure distribution levels, comprising the steps of:

generating a gas cushion above said pressure box, wherein said gas cushion is smaller than the glass sheet and has a temperature at least substantially equal to that of the glass sheet;

positioning and supporting a stationary glass sheet on said gas cushion; and controlling said gas cushion such that a ratio of a pressure in the box to a pressure in the gas cushion is between 3 and 7, and such that the glass sheets have a lift height of between 0.5 mm and 3 mm above said pressure box.

9. The process of claim 8 wherein said lift height is about 2 mm.

10. The process of claim 8 wherein a gas speed of the gas cushion is less than 20 m/sec.

11. The process of claim 8 wherein a gas speed of the gas cushion is about 10 m/sec.

12. A bending process for bending glass sheets including supporting at least a central part of heated glass sheets moving through a bending station including a pressure box comprising a plurality of individual compartments which are elongate in a direction transverse to a direction of travel of the glass sheets, said compartments having a width in the direction of glass sheet travel which is smaller than a height of the glass sheet in the direction of glass sheet travel, means for supplying said compartments with hot gas and means for providing the gas supplied to said compartments with at least two pressure distribution levels, comprising the steps of:

conveying a glass sheet on a bed of rollers through a furnace and heating said glass sheet to a bending temperature thereof in said furnace;

moving the glass sheet in the bending station onto a hot gas cushion generated by the pressure box, said gas cushion having a temperature of at least 600° C. and being smaller than the glass sheet and;

stopping the glass sheet while the glass sheet is supported on the gas cushion; and taking over the stopped glass sheet with bending tools by raising an annular or lower mold surrounding the pressure box to raise the glass sheet, and pressing the glass sheet between said lower mold and an upper bending mold.

13. The bending station of claim 1, wherein said pressure box has a lower plate and said gas discharge sleeves extend over the full height of said pressure box from said upper plate to said lower plate.

* * * * *